United States Patent
Lin et al.

(10) Patent No.: US 8,848,826 B2
(45) Date of Patent: Sep. 30, 2014

(54) METHOD FOR ADAPTIVELY DRIVING DATA TRANSMISSION AND COMMUNICATION DEVICE USING THE SAME

(75) Inventors: Shu-Yu Lin, Taipei (TW); Sheng-Chung Wu, Taipei (TW)

(73) Assignee: ASMedia Technology Inc., New Taipei (TW)

(*) Notice: Subject to any disclaimer, the term of this patent is extended or adjusted under 35 U.S.C. 154(b) by 0 days.

(21) Appl. No.: 13/470,365

(22) Filed: May 14, 2012

(65) Prior Publication Data
US 2013/0089122 A1  Apr. 11, 2013

(30) Foreign Application Priority Data
Oct. 7, 2011 (TW) ............... 100136550 A (51) Int. Cl.
H04L 25/03 (2006.01)
H04L 27/04 (2006.01)
H04B 1/44 (2006.01)
H04L 27/01 (2006.01)
H04B 15/00 (2006.01)

(52) U.S. Cl.
CPC ...................... *H04B 1/44* (2013.01)
USPC .......... 375/296; 375/232; 375/230; 375/229; 375/295; 326/30; 326/21; 327/306; 327/331; 327/100

(58) Field of Classification Search
USPC .............. 326/30, 21; 327/306, 331, 332, 100; 375/232, 231, 229, 230, 296, 295
See application file for complete search history.

(56) References Cited

U.S. PATENT DOCUMENTS

| | | | |
|---|---|---|---|
| 7,170,930 B2 | 1/2007 | Denny et al. | |
| 8,014,471 B2 | 9/2011 | Tonietto et al. | |
| 8,121,803 B2* | 2/2012 | Kim et al. | 702/69 |
| 2004/0268190 A1* | 12/2004 | Kossel et al. | 714/704 |
| 2006/0188043 A1 | 8/2006 | Zerbe et al. | |
| 2010/0158530 A1 | 6/2010 | Soto et al. | |
| 2011/0305271 A1* | 12/2011 | Zerbe et al. | 375/232 |
| 2011/0317564 A1* | 12/2011 | Saibi et al. | 370/249 |
| 2011/0317753 A1* | 12/2011 | Marquina et al. | 375/232 |
| 2012/0207196 A1* | 8/2012 | Zerbe et al. | 375/219 |

FOREIGN PATENT DOCUMENTS

TW       201032519       9/2010

OTHER PUBLICATIONS

Hellerstein et al., Feedback Control of Computing Systems, 2004, John Wiley & Sons, Inc., pp. 1-27.*
IEEE Recommended Practices for Broadband Local Area Networks, IEEE Std 802.7-1989, p. 49, 1990.*
"Office Action of Taiwan Counterpart Application", issued on Feb. 18, 2014, p. 1-p. 9, in which the listed references were cited.

* cited by examiner

*Primary Examiner* — Chieh M Fan
*Assistant Examiner* — Michelle M Koeth
(74) *Attorney, Agent, or Firm* — Jianq Chyun IP Office (57) ABSTRACT

A method for adaptively driving data transmission and a communication device using the same are provided. The proposed method includes following procedures. Detection result is generated after detecting a receiving signal on a receiving path of the communication device. Driving parameter is generated according to the detection result. Finally, a transmitting signal on a transmitting path is adjusted according to the driving parameter.

10 Claims, 5 Drawing Sheets

METHOD FOR ADAPTIVELY DRIVING DATA TRANSMISSION AND COMMUNICATION DEVICE USING THE SAME

CROSS-REFERENCE TO RELATED APPLICATION

This application claims the priority benefit of Taiwan application serial no. 100136550, filed on Oct. 7, 2011. The entirety of the above-mentioned patent application is hereby incorporated by reference herein and made a part of this specification.

BACKGROUND

1. Field of the Invention

The invention relates to a method for adaptively driving data transmission, and particularly relates to a method for adaptively driving data transmission of a high-speed input/output system and a communication device using the same.

2. Description of Related Art

The current trend of signal (or data) transmission between electronic devices or within an electronic device is directed to high-speed transmission. In order to achieve high-speed transmission, transmission of most input/output (I/O) systems use differential signals for data transmission to mitigate the noise interference generated during the high-speed signal transmission and simultaneously reduce the influence of its data transmission on other electric circuits.

Figure 1A:
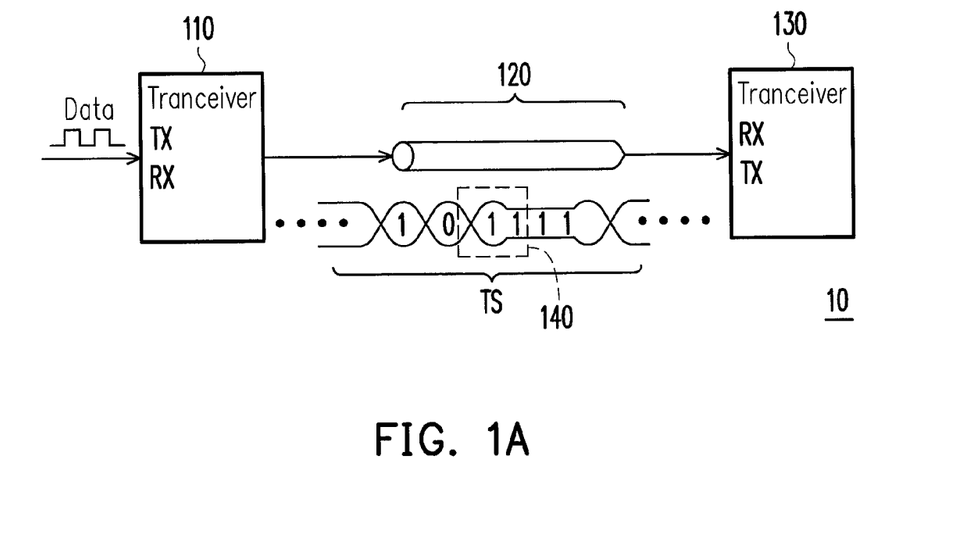
FIG. 1A is a schematic diagram of a high-speed input/output system.

FIG. 1A is a schematic diagram illustrating a high-speed input/output system. In a high-speed I/O system 10 illustrated in FIG. 1, a transceiver 110 and another transceiver 130 transmit and receive data signals through a transmission line 120. The transceiver 110 has a transmitting end TX and a receiving end RX in pair, corresponding to a receiving end RX and a transmitting end TX in pair of the transceiver 130. The transceiver 110 drives data as an output signal after receiving the data to be transmitted (e.g., digital signal), and transmits the output signal to the transceiver 130 through the transmission line 120.

During the high-speed signal transmission, the transceiver 110 usually generates a sequence of transmitting signal TS based on the output signal. In the transmitting signal TS, the transceiver 110 does not change the driven amplitude level when the data signals of "0" and "1" are transmitted in turn continuously. However, when a plurality of data signals of "0" or "1" are transmitted continuously, the transceiver 110 may de-emphasize or pre-emphasize the driven amplitude level. Taking a partial transmission signal 140 in FIGS. 1A and 1B as an example for illustration, the partial transmission signal 140 illustrates a de-emphasized amplitude level. Without de-emphasis or pre-emphasis applied on the driven amplitude level, when switching back to the opposite state during the high speed signal transmission (e.g., continuous transmission of data signals of "1" followed by switching back to transmission of data signal of "0"), the transmitting signal is likely not to be switched back in time, rendering floating effect of amplitude level of the signal received at the receiving end. Floating of amplitude level of the signal makes the transceiver 130 at the receiving end unable to identify the last bit or last few bits of the data signals of "0" or "1" that are sent continuously.

Figure 1B:
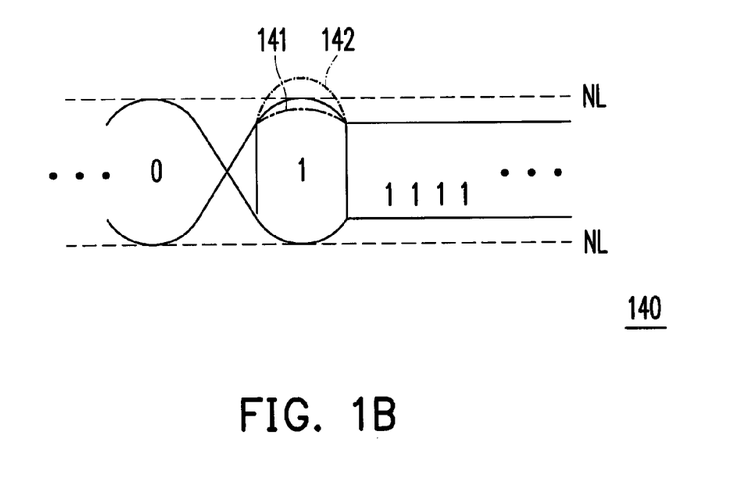
FIG. 1B illustrates a tolerable range of de-emphasis or pre-emphasis of amplitude level.

FIG. 1B illustrates a tolerable range of de-emphasis level and pre-emphasis level. In FIG. 1B, an amplitude level line NL is usually a communication standard followed by the high-speed I/O system 10 (e.g., USB, SATA, PCI Express standard, and so like.) Waveforms 141 and 142 respectively represent the tolerable range for the amplitude level line NL which may be de-emphasized and pre-emphasized, for example, ±6 dB.

Usually, the communication standard only specifies the transmitting end to drive in a fixed way, which uses a fixed amplitude level and apple fixed de-emphasis or fixed pre-emphasis of the amplitude level on the driven transmission signals. However, channel fading effects of the transmission line are prone to the influence of the length of the transmission line and the surrounding electric circuits. For example, the transmission line used by the high-speed I/O system 10 may a bus circuit of a printed circuit board in addition to the wires for data transmission. There may be a plurality of combinations of the printed circuit boards and wires for data transmission, which may result in a plurality of possible lengths of the transmission lines. If a fixed driving is applied on the data transmission, link failure between two device ends of the high-speed I/O system 10 may easily occur.

SUMMARY

The invention is directed to a method for adaptively driving data transmission, and the method includes the following steps: A receiving signal is detected on a receiving path of a communication device and detection result is generated. A driving parameter is generated based on the o detection result. Finally, a transmitting signal on a transmitting path is adjusted based on the driving parameter.

According to an embodiment of the invention, the invention proposes a communication device. The communication device includes a detector module, a main controller, a driving control module, and a transmitter data driver. The detector module configured for detecting a first receiving signal on a first receiving path and generating detection result. The main controller is connected to the detector module and configured for receiving the detection result and generating a driving parameter. The driving control module is connected to the main controller and is configured for receiving the driving parameter and generating a control signal. Additionally, the transmitter data driver is connected to the driving control module and configured for adjusting a transmitting signal on a transmitting path after receiving the control signal.

In order to make the aforementioned and other features and advantages of the disclosure more comprehensible, embodiments accompanying figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

Figure 2:
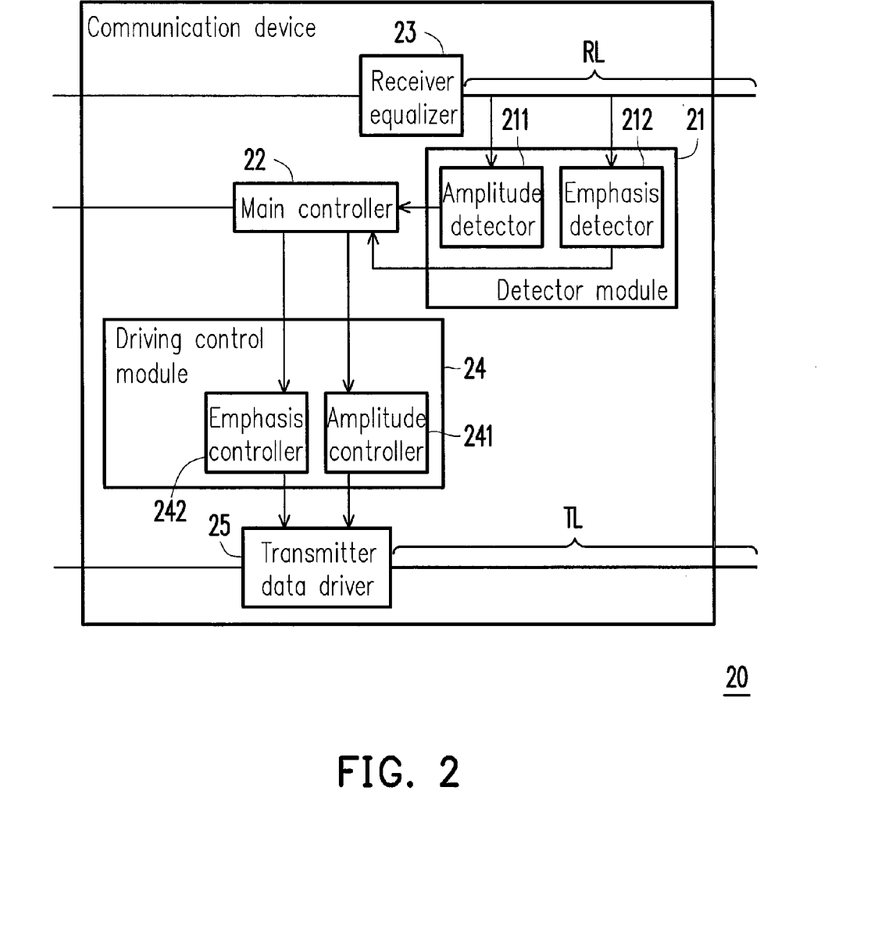
FIG. 2 is a functional block diagram of a communication device according to an embodiment.

FIG. 2 is a functional block diagram of a communication device according to an embodiment of the invention. The communication device 20 is suitable for adaptively adjusting driving of data transmission, and the communication device 20 may be integrated with an electronic device. For example, the communication device 20 may be integrated with a computer, a laptop computer, a tablet computer, a mobile phone, a mobile hard-drive device, a mobile solid state disk, an external optical disk drive or a hand-held electronic device.

As illustrated in FIG. 2, the communication device 20 includes a detector module 21, a main controller 22, a receiver equalizer (or RX equalizer) 23, a driving control module 24, and a transmitter data driver (or TX data driver) 25. The receiver equalizer 23 is connected to an external device through a receiving path RL, and the transmitter data driver 25 is connected to the same external device through a transmitting path TL.

In a practical operation, the transmitting path TL and the receiving path RL illustrated in FIG. 2 are disposed in the same transmission line or at the same side. With respect to the receiving path RL, another side of the receiver equalizer 23 is connected to an electronic device to which the communication device 20 may be integrated, and the receiver equalizer 23 may be connected to a corresponding controller chip through a bus of a printed circuit board (PCB). The technical content of the controller chip will not be further described here. Similarly, with respect to the transmitting path TL, another side of the transmitter data driver 25 may be connected to an electronic device to which the communication device 20 may be integrated. The technical content of the electronic device will not be further described here.

Referring to FIG. 2, the detector module 21 is connected to the receiving path RL and the main controller 22, and may include an amplitude detector 211 and an emphasis detector 212. The amplitude detector 211 is configured to detect an amplitude level of a receiving signal on the receiving path RL, and provides a first detection result to the main controller 22. As illustrated in FIG. 1B, the emphasis detector 212 is configured detect a de-emphasis level of signal strength or a pre-emphasis level of signal strength of the receiving signal on the receiving path RL and provides a second detection result to the main controller 22.

The main controller 22 has a mapping table, and the main controller 22 may use the mapping table to find a corresponding status of the receiving path RL based on the first detection result and the second detection result. Since the transmitting path TL and the receiving path RL, which are connected to the transmitter data driver 25, are disposed on the same side or in the same transmission line, the main controller 22 can therefore determine an amplitude level that the transmitter data driver 25 should use and the de-emphasis level and pre-emphasis level of signal strength for transmitting the signal.

The receiver equalizer 23 is configured to receive the receiving signal on the receiving path RL and use a training sequence in the receiving signal to perform a training session to train one or more equalizing parameters that may be used to mitigate channel fading on the receiving path RL.

Referring to FIG. 2, the main controller 22 is connected to the driving control module 24 that includes an amplitude controller 241 and an emphasis controller 242. The amplitude controller 241 and the emphasis controller 242 respectively receive different driving parameters provided by the main controller 22, and then respectively provide different control signals to the transmitter data driver 25 according to these control signals. As such, the transmitter data driver 25 may be enabled to adaptively adjust a parameter associated with the amplitude level that the transmitter data driver 25 should use and also adjust a parameter associated with de-emphasis level or pre-emphasis level of signal strength.

An example below briefly explains the approach that the amplitude controller 241 and the emphasis controller 242 adaptively adjust the driving parameters of the transmitter data driver 25. Table 1 illustrates simple combinations of the amplitude level and the de-emphasis level or the pre-emphasis level of signal strength.

TABLE 1

| Swing of the amplitude level | De-emphasis level or pre-emphasis level |
|---|---|
| Large | Weak |
| Small | Weak |
| Large | Strong |
| Small | Strong |

In Table 1, a size of swing represents an amplitude level detected by the amplitude detector 211, and the de-emphasis level or pre-emphasis level may represent the emphasis level of signal strength of the signal detected by the emphasis detector 212.

In one embodiment, when the communication device 20 is connected to a first electronic device through an external transmission line, the amplitude detector 211 detects a slight swing of an amplitude level, but the emphasis detector 212 detects a strong de-emphasis level or a strong pre-emphasis level of signal strength. This situation may correspond to that the channel fading of the transmission line is not serious, but the amplitude detector 211 detects a slight swing of the amplitude level because the corresponding electronic device may be less capable of driving amplitude level or because of the concern of power saving. Since the de-emphasis level or the pre-emphasis level of signal strength corresponds to a difference between high frequency signal and low frequency signal in the receiving signal, given that the swing of the amplitude level is slight and the de-emphasis level or pre-emphasis level of signal strength is strong, the main controller 22 may provide a first reference signal to the amplitude controller 241 and the emphasis controller 242, such that the amplitude controller 241 and the emphasis controller 242 controls the transmitter data driver 25 to use a larger parameter for the amplitude level and use a slightly smaller parameter for the de-emphasis level or the pre-emphasis level of signal strength (relative to the de-emphasis level or the pre-emphasis level of signal strength of the receiving signal). For example, if the amplitude detector 211 detects a swing of amplitude level of 800 mV, the transmitter data driver 25 will use a larger swing of amplitude level of 1000 mV in the transmitting signal on the transmitting path TL. Moreover, if the emphasis detector 212 originally detects a strong de-emphasis level of the receiving signal of +6 dB, the transmitter data driver 25 will use a smaller swing of amplitude level of +3 dB in the transmitting signal on the transmitting path TL.

In one embodiment, when the communication device 20 is alternatively connected to a second electronic device through an external transmission line, the amplitude detector 211 detects a slight swing of amplitude level and the emphasis detector 212 detects a weak de-emphasis level or a weak pre-emphasis level of signal strength on the receiving path RL. This situation may correspond to that the channel fading of the transmission line is serious and the transmission line is longer. When the swing of the amplitude level is smaller and the de-emphasis level or the pre-emphasis level of signal strength is weaker, the main controller 22 may provide a second reference signal to the amplitude controller 241 and the emphasis controller 242, such that the amplitude controller 241 and the emphasis controller 242 may control the transmitter data driver 25 to use a larger parameter for the amplitude level and a slightly larger parameter for the de-emphasis level or the pre-emphasis level of signal strength (relative to the de-emphasis level or the pre-emphasis level of signal strength of the receiving signal) on transmitting signal in the transmitting path TL.

Through the proposed method used by the communication device 20 to adaptively adjust driving of data transmission described previously, the loss of different channels may be adaptively compensated, the compatibility of the communication device 20 as a high-speed I/O system may be improved, and the hardware cost of the adaptively adjusting mechanism is meanwhile reduced.

In one embodiment, the detector module 21 may detect frequency energy value of a receiving signal at a receiving end of a receiving path, then make use of the difference between high frequency energy and low frequency energy and providing information of detected difference to a main controller. The main controller may refer to a preset mapping table, map the difference between high frequency energy and low frequency energy to the mapping table and choose one driving parameter or more driving parameters of a transmitting signal on a transmitting path on the same side of the receiving path based on the correspondence of the difference between high frequency energy and low frequency energy, so as to adaptively adjust the driving parameters of driving parameters at a transmitting end of the transmitting path. Namely, the difference between high frequency energy and low frequency energy of a receiving signal on a receiving path is used to adaptively adjust a transmitting end of a transmitting path on the same side and drive a parameter of amplitude level and a driving parameter of a de-emphasis level and a pre-emphasis level for the transmitting signal.

Figure 3:
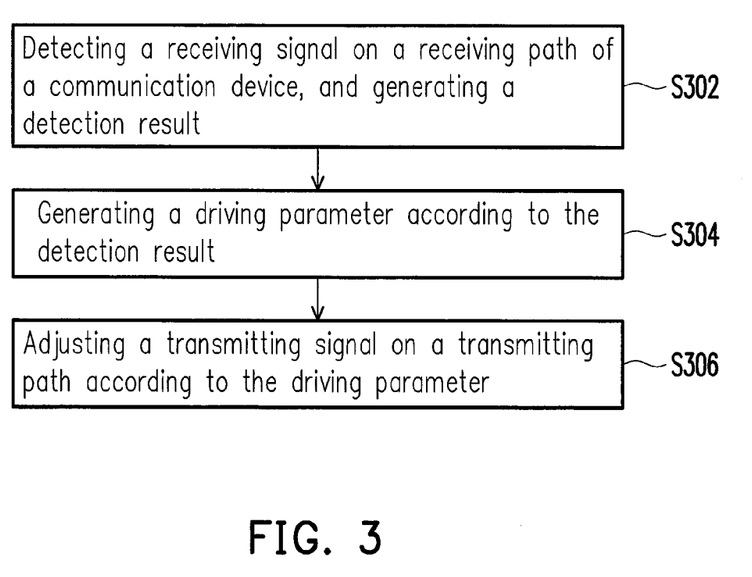
FIG. 3 is a flowchart illustrating a method for adaptively driving data transmission according to an embodiment.

FIG. 3 is a flowchart illustrating a method for adaptively driving data transmission according to an embodiment. Referring to both FIG. 2 and FIG. 3, at step S302, the amplitude detector 211 and the emphasis detector 212 respectively detect a receiving signal on a receiving path and generate corresponding detection result(s). The detection result may include, for example, a first amplitude level and a first emphasis level, or the detection results may be a frequency energy value.

At step S304, a corresponding parameter is generated based on the detection result. Taking the embodiment illustrated in FIG. 3 for example, a swing of the amplitude level detected by the amplitude detector 211 and a first amplitude level and a first emphasis level of signal strength detected by the emphasis detector 212 are respectively provided to the main controller 22. The main controller 22 then refers to a preset mapping table and correspondingly generates one driving parameter or more driving parameters based on mapping of the detection result (the first amplitude level and the first emphasis level) to the mapping table. The one parameter or more parameters may include, for example, a second amplitude level and a second emphasis level.

At step S306, the main controller 22 may control the transmitter data driver 25 through the amplitude controller 241 and the emphasis controller 242, and use one driving parameter or more driving parameters generated by the main controller 25 to adjust the transmitting signal on the transmitting path. Accordingly, the conventional fixed driving method can be replaced by the proposed method for adaptively driving data transmission.

After step S306, the method for adaptively driving data transmission is completed. In a practical operation, the step S302 to the step S306 may be executed circularly to continuously respond to changes of channel fading of the transmission line by adaptively adjusting one or more driving parameters of the transmitter data driver 25.

Figure 4:
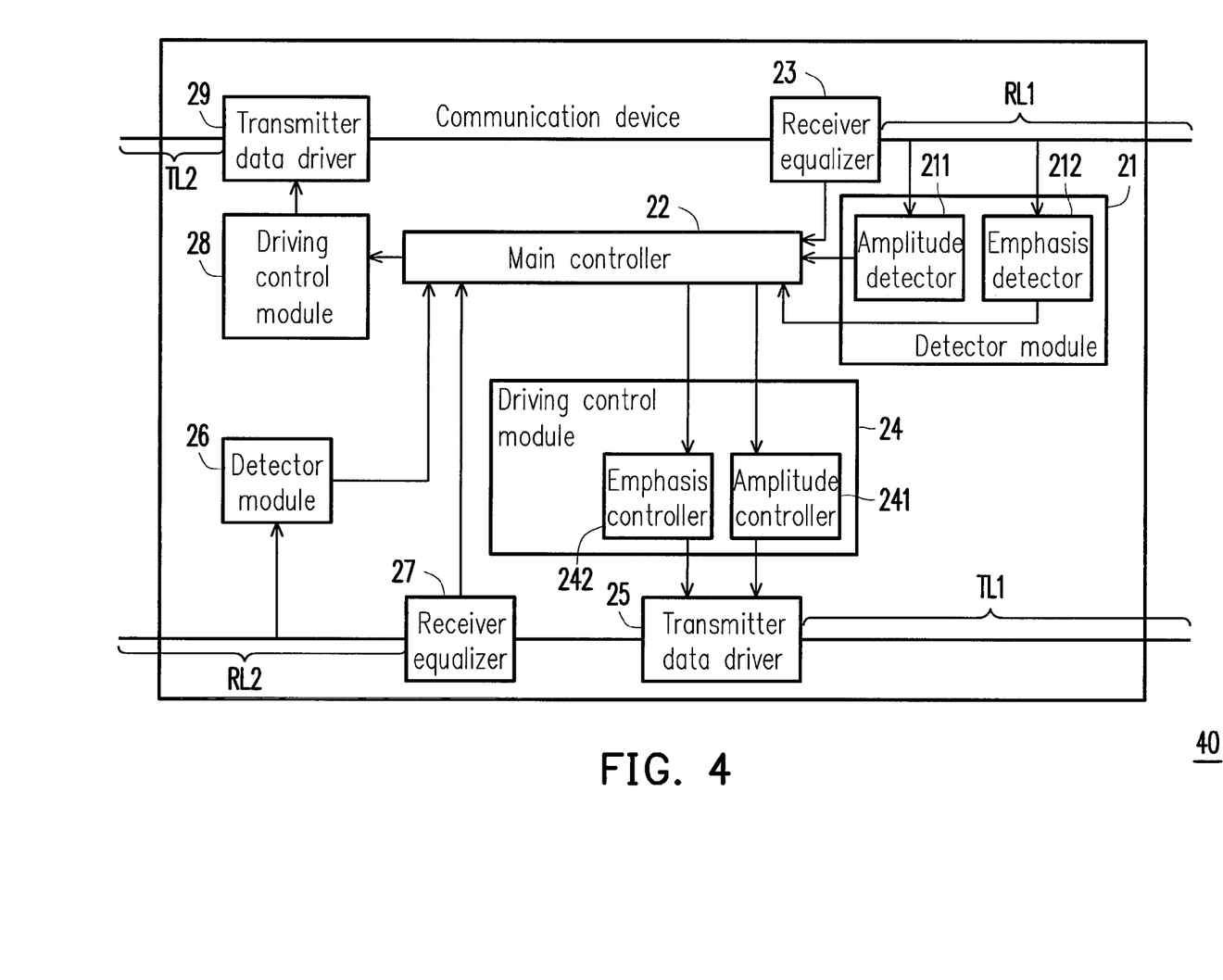
FIG. 4 is a functional block diagram of another communication device according to an embodiment.

FIG. 4 is a functional block diagram of a communication device according to an embodiment. Referring to FIG. 4, a communication device 40 is suitable for adaptively adjusting driving of data transmission, and the communication device 40 may be configured as a re-driver communication device allocated between a third electronic device and a fourth electronic device, so as to extend a transmission line between the third electronic device and the fourth electronic device. For example, the third electronic device may be a host device, and the fourth electronic device may be a client device. The communication device 40 provides functionality to re-drive transmission signal, and thus a high-speed data transmission with excellent signal quality between the third electronic device and the fourth electronic device can be maintained.

In one embodiment as illustrated in FIG. 4, the communication device 40 includes a detector module 21, a main controller 22, a receiver equalizer 23, a driving control module 24, a transmitter data driver 25, a detector module 26, a receiver equalizer 27, a driving control module 28, and a transmitter data driver 29. The receiver equalizer 23 and the transmitter data driver 25 of the communication device 40 are connected to a third electronic device (not shown) through a first receiving path RL1 and a first transmitting path TL1, respectively. The receiver equalizer 27 and the transmitter data driver 29 of the communication device 40 are connected to a fourth electronic device (not shown) through a second receiving path RL2 and a second transmitting path TL2, respectively.

In one embodiment, the first transmitting path TL1 and a first receiving path RL1 illustrated in FIG. 4 are disposed in a transmission line connected to the third electronic device. Alternatively, the first transmitting path TL1 and the first receiving path RL1 are disposed at the same side. The second transmitting path TL2 and the second receiving path RL2 are disposed in another transmission line connected to the fourth electronic device. Alternatively, the second transmitting path TL2 and the second receiving path RL2 are disposed at the same side.

With respect to the first receiving path RL1, another side of the equalizer receiver 23 is connected to the transmitter data driver 29. The receiver equalizer 23 transmits a first receiving signal received from the first receiving path RL1 to the transmitter data driver 29, and simultaneously uses the training sequence in the first receiving signal on the first receiving path RL to perform a training session, so as to obtain one equalizing parameter or more equalizing parameters that may be used to mitigate channel fading of the first receiving path RL1. The transmitter data driver 29 continuously drives the first receiving signal to be the first transmitting signal to the second transmitting path TL2.

In one embodiment, the detector module 21 is connected to the first receiving path RL1 and the main controller 22, and the detector module 21 may include the amplitude detector 211 and the emphasis detector 212. The amplitude detector 211 detects the amplitude level of the receiving signal of the first receiving path RL1, and provides a first detection result to the main controller 22. The first detection result corresponds to the amplitude level of the receiving signal. Similarly, the emphasis detector 212 detects the de-emphasis level or pre-emphasis level of signal strength of the receiving signal on the receiving path RL1, as illustrated in FIG. 1B, and then provides a second detection result to the main controller 22. The second detection result corresponds to the de-emphasis level or pre-emphasis level of signal strength of the receiving signal.

In an embodiment, the main controller 22 has a mapping table, and the main controller 22 may use the mapping table to find a corresponding status of the receiving path RL based on the first detection result and the second detection result. Since the transmitting path TL and the receiving path RL, which are connected to the transmitter data driver 25, are disposed on the same side or in the same transmission line, the main controller 22 can adaptively choose one driving parameter or more driving parameters that the transmitter data driver 25 should use based on the first detection result and the second detection result. The one driving parameter or more driving parameters may include the amplitude level and the emphasis level.

Referring to FIG. 4, the main controller 22 is connected to the driving control module 24, which includes an amplitude controller 241 and an emphasis controller 242. The amplitude controller 241 and the emphasis controller 242 both receive a reference signal provided by the main controller 22, and, provide a control signal to the transmitter data driver 25 based on the reference signal, so as to adaptively adjust one driving parameter or more driving parameters that the transmitter data driving unit 25 should use. The one driving parameter or more driving parameters may include parameters for the amplitude level and the emphasis level.

Through the proposed method that the communication device 40 uses to adaptively adjust driving of data transmission described previously, the compatibility of the communication device 40 as a high-speed I/O system may be improved, and the hardware cost for the adaptively adjusting mechanism may be reduced.

Similarly, one side of the receiver equalizer 27 is connected to the second receiving path RL2, and the other side of the receiver equalizer 27 is connected to the transmitter data driver 25. The receiver equalizer 27 transmits a second receiving signal received by the second receiving path RL2 to the transmitter data driver 25, and uses the training sequence of the second receiving signal on the second receiving path RL2 to perform a training session to obtain one or more equalizing parameters. The one equalizing parameter or more equalizing parameters are used to mitigate channel fading of the second receiving path RL2. The transmitter data driver 25 continuously drives the second receiving signal to be the second transmitting signal to the first transmitting path TL1.

In one embodiment, the detector module 26 detects the amplitude level of the second receiving signal and the de-emphasis level or pre-emphasis level of signal strength of the second receiving signal on the second receiving path RL2, and then respectively provide a third detection result and a fourth detection result to the main controller 22. The third detection result corresponds to the amplitude level of the receiving signal, and the fourth detection result corresponds to the de-emphasis level or pre-emphasis level of signal strength of the receiving signal.

Similarly, the main controller 22 may refer to the mapping table and find a corresponding status of the second receiving path RL2 based on the third detection result and the fourth detection result. Since the second transmitting path TL2 and the second receiving path RL2 connected to the transmitter data driver 29 are disposed on the same side and in the same transmission line, the main controller 22 is allowed to adaptively choose one driving parameter or more driving parameters that the transmitter data driver 29 should use based on the third detection result and the fourth detection result. The one driving parameter or more driving parameters may include the amplitude level and the emphasis level.

Further, the receiver equalizer 23 may determine whether a training session executed by the training sequence of the first receiving signal has been completed based on a preset internal mapping index of training. When the (equalizing) training session of the receiver equalizer 23 is completed, a notifying signal is transmitted from the receiver equalizer 23 to the main controller 22, in order to start transmitting the one driving parameter or more driving parameters generated by the main controller 22 to the driving control module 24. In the present embodiment, when the receiver equalizer 23 has not completed the training session, the main controller 22 can stop the transmitter data driver 25 from transmitting the second transmitting signal to the first transmitting path TL1. After the receiver equalizer 23 completes the training session, the main controller 22 allows the transmitter data driver 25 to transmit the second transmitting signal to the first transmitting path TL1. Similarly, the receiver equalizer 27 may determine whether a training session of the training sequence of the second receiving signal has been completed based on a preset internal mapping index of training. When the (equalizing) training session of the receiver equalizer 27 is completed, a notifying signal is transmitted to the main controller 22. In the present embodiment, when the receiver equalizer 27 has not completed the training session, the main controller 22 can stop the transmitter data driver 27 from transmitting the second transmitting signal to the first transmitting path TL2.

Moreover, in other embodiments, the stopping approach of the main controller 22 described previously may be applied only for a few microseconds in a training session of several milliseconds in order to reduce the ratio of sacrificed training signal to 1% while ensuring that the receiver equalizer identifies fixed patterns of the receiving signal and also ensuring that the transmitter data driver switches the transmitting signal to a correct state when the receiving signal is driven as the transmitting signal. Accordingly, it can be ensured that a receiving end corresponding to the transmitter data driver is switched to a correct state.

Alternatively, in other embodiments, the detector module may detect the frequency energy value of the receiving signal at a receiving end of a receiving path, and provide information of the difference between high frequency energy and low frequency energy to a main controller. The main controller may refer to a mapping table and map the difference between high frequency energy and low frequency energy to the mapping table to choose at least one driving parameter of a transmitting signal of a transmitting path on the same side of the receiving path, so as to adaptively adjust at least one driving parameter of the data driver of the transmitting end of the transmitting path. Namely, based on the high frequency or low frequency of a receiving signal of a receiving path, the parameters of the amplitude level and the emphasis level used to drive the transmitting signal at a transmitting end of the transmitting path on the same side of the receiving path are adaptively adjusted.

Figure 5:
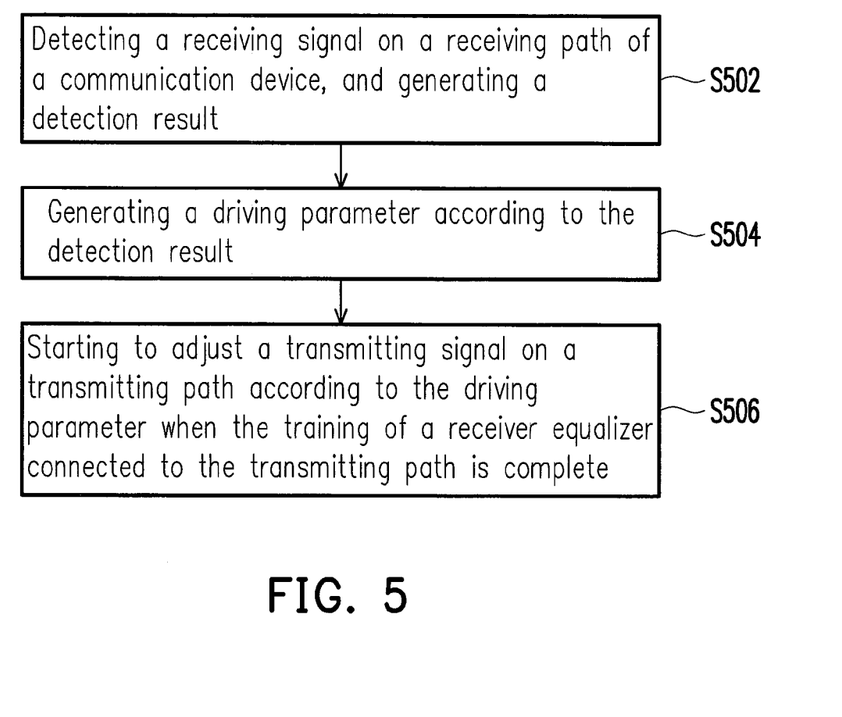
FIG. 5 is a flowchart illustrating another method for adaptively driving data transmission according to an embodiment.

FIG. 5 is a flowchart illustrating a method for adaptively driving transmission data. Referring to both FIGS. 4 and 5 together, and taking FIG. 4 for example, at step S502, the amplitude detector 211 and the emphasis detector 212 are configured to respectively detect the first amplitude level of the first receiving signal and the first de-emphasis level or pre-emphasis level of signal strength of the first receiving signal on the first receiving path RL1, and correspondingly generate detection result(s). The detection result may be, for example, the first amplitude level and the first emphasis level of signal strength previously described.

At step S504, the amplitude detector 211 and the emphasis detector 212 respectively provide the first amplitude level and the first emphasis level of the receiving signal to the main controller 22. The main controller 22 refers to a preset mapping table to map the detection result to the mapping table, and correspondingly generates one driving parameter or more driving parameters that a transmitting signal of a first transmitting path TL1 corresponding to the first receiving path RL1 should use. The one driving parameter or more driving parameters may include the second amplitude level and the second de-emphasis or pre-emphasis of signal strength.

At step S506, after the receiver equalizer 27 connected to the first transmitting path TL1 completes its training session, the main controller 22 will transmit the generated driving parameter or driving parameters to the driving control module 24 to adaptively adjust the transmitting signal of the first transmitting path TL1, instead of using the conventional way of fixed driving.

After step S506, the method for adaptively driving transmission data is completed. In a practical operation, the step S502 to the step S506 may be executed circularly to continuously respond to change of channel fading of the transmission line by adaptively adjusting one driving parameter or more driving parameters of the transmitter data driver 25.

In other embodiments, the method for adaptively driving transmission data may adaptively adjust the parameters of the amplitude level and the emphasis level of signal strength primarily based on the difference between high frequency energy and low frequency energy of a receiving signal of a receiving path. The adjusted parameters of the amplitude level and the emphasis level of signal strength may be used by a transmitting end of a transmitting path on the same side of the receiving path to drive the transmitting signal thereof.

Based on the aforementioned descriptions, the invention adaptively adjusts the parameters of amplitude level and emphasis level of signal strength with which a transmitting end of a path drives the transmitting signal thereof based on the difference between high frequency energy and low frequency energy of a receiving signal of another path. Additionally, based on whether the receiver equalizer completes its training session or not, the timing that the transmitter data driver starts to transmit a signal is controlled. Accordingly, the compatibility of high-speed data transmission is improved, and the hardware cost is reduced.

Although the disclosure has been described with reference to the above embodiments, it will be apparent to one of the ordinary skill in the art that modifications to the described embodiment may be made without departing from the spirit of the disclosure. Accordingly, the scope of the invention will be defined by the attached claims not by the above detailed descriptions.

What is claimed is:

1. A method for adaptively driving transmission data, suitable for a communication device, comprising:
   detecting a receiving signal received from an external device on a first receiving path of the communication device and generating a detection result;
   generating a driving parameter according to the detection result;
   executing and completing a receiver equalizer training session by using a training sequence signal of a second receiving signal on a second receiving path;
   transmitting a notifying signal to a main controller when the training session is completed;
   transmitting the generated driving parameter after transmitting the notifying signal; and
   adjusting a transmitting signal transmitted to the external device on a transmitting path of the communication device according to the transmitted driving parameter,
   wherein the receiving path and the transmitting path are disposed in the same transmission line within the communication device, and
   wherein after generating the driving parameter, but before completing the receiver equalizer training session, stopping transmitting of the transmitting signal to the transmitting path for a part of the training session.

2. The method for adaptively driving transmission data of claim 1, wherein the detection result comprises a first amplitude level and a first emphasis level.

3. The method for adaptively driving transmission data as claimed in claim 1, wherein the driving parameter comprises a second amplitude level and a second emphasis level.

4. The method for adaptively driving transmission data of claim 1, wherein the detection result is a frequency energy value.

5. The method for adaptively driving transmission data of claim 1, wherein the step of generating the driving parameter according to the detection result is generating the driving parameter after comparing the detection result with a preset mapping table.

6. A communication device, comprising:
   a detector module, configured for detecting a first receiving signal received from an external device on a first receiving path and generating a detection result;
   a main controller, connected to the detector module, configured for receiving the detection result and generating a driving parameter;
   a driving control module, connected to the main controller, configured for receiving the driving parameter and generating a control signal;
   a receiver equalizer, connected to the main controller and the transmitting path, configured to use a training sequence signal of a second receiving signal on a second receiving path to execute a training session; and
   a transmitter data driver, connected to the driving control module, configured for receiving the control signal and adjusting a transmitting signal transmitted to the external device on a transmitting path,
   wherein the receiver equalizer transmits a notifying signal to the main controller when the receiver equalizer completes the training session, and then the main controller starts to transmit the driving parameter generated by the main controller to the driving control module,
   wherein the first receiving path and the transmitting path are disposed in the same transmission line within the communication device,
   wherein after the main controller is configured for generating the driving parameter, the main controller is further configured for stopping transmitting the transmitting signal to the transmitting path for a part of the training session when the receiver equalizer has not completed the training session.

7. The communication device of claim 6, wherein the detector module comprises:
   a first amplitude detector, configured for generating an amplitude level after detecting the first receiving signal; and
   a first emphasis detector, configured for generating a first emphasis level after detecting the first receiving signal.

8. The communication device as claimed in claim 6, wherein the driving control module comprises:
   a second amplitude controller, connected to the transmitter data driver and the main controller, configured for receiving a second amplitude level of the driving parameter; and
   an emphasis controller, connected to the transmitter data driver and the main controller, configured for receiving a second de-emphasis or pre-emphasis of signal strength of the driving parameter.

9. The communication device of claim 6, wherein the detection result is a frequency energy value.

10. The communication device of claim 6, wherein the main controller includes a preset mapping table, and the main controller is configured to compare the detection result with the preset mapping table to generate the driving parameter.

\* \* \* \* \*